United States Patent Office 3,285,933
Patented Nov. 15, 1966

3,285,933
NOVEL 2,3-DIOXOPYRROLIDINE-3-THIOSEMICARBAZONES
Koert Gerzon and Eriks Krumkalns, Indianapolis, Ind., assignors to Eli Lilly and Company, Indianapolis, Ind., a corporation of Indiana
No Drawing. Filed Nov. 2, 1964, Ser. No. 408,378
5 Claims. (Cl. 260—326.3)

This invention relates to a novel group of 2,3-dioxopyrrolidine-3-thiosemicarbazones.

The compounds provided by this invention can be represented by the following formula:

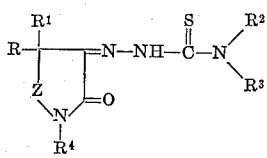

wherein R, when taken alone, is a member of the group consisting of hydrogen, phenyl, halophenyl, lower-alkoxyphenyl, phenylphenyl, nitrophenyl, benzyl, halobenzyl, lower alkoxybenzyl, phenylbenzyl, nitrobenzyl, and carbo-lower-alkoxy; $R^1$, when taken alone, is hydrogen; R and $R^1$, when taken together, represent a member of the group consisting of benzylidene, halobenzylidene, lower-alkoxybenzylidene, nitrobenzylidene, and phenylbenzylidene; $R^2$ and $R^3$ are the same or different members of the group consisting of hydrogen and lower alkyl; $R^4$ is a member of the group consisting of lower alkyl and hydroxy-substituted $C_2$-$C_6$ alkyl; and Z is a member of the group consisting of —$CH_2$— and $$-\overset{O}{\underset{\|}{C}}-$$

In the above formula, when R represents halophenyl, lower-alkoxyphenyl, nitrophenyl, phenylphenyl, halobenzyl, lower-alkoxybenzyl, nitrobenzyl or phenylbenzyl, the substituent on the phenyl ring can be an ortho, meta or para substituent. The same is true with regard to the phenyl ring substituents when R and $R^1$ are taken together to form a substituted benzylidene radical. Typical substituted phenyl, benzyl, or benzylidene groups which illustrate the scope of the substituents on the 4 position of the pyrrolidine ring of compounds represented by the above formula include o-chlorobenzylidene, p-chlorobenzyl, m-nitrobenzyl, o-phenylbenzyl, p-ethoxybenzylidene, 2,3-dimethoxybenzylidene, 3,4-dioxy-methylenebenzylidene, p-isopropoxybenzylidene, p-nitrobenzyl, m-iodobenzyl, p-phenylbenzylidene, p-(n-propyl)benzyl, o-nitrobenzylidene, p-chlorobenzyl, 2,4-dichlorobenzylidene, p-bromobenzyl, p-bromobenzylidene, p-iodobenzylidene, p-fluorobenzylidene, p-chlorophenyl, m-bromophenyl, p-fluorophenyl, p-anisyl, o-anisyl, m-ethoxyphenyl and the like.

In the above formula, when $R^2$, $R^3$ and $R^4$ represent lower alkyl groups, they can be methyl, ethyl, isopropyl, or n-propyl. When $R^4$ represents a hydroxy-substituted $C_2$-$C_6$ alkyl group, it can, illustratively, be any of the following or like groups when substituted with one or more hydroxy groups: ethyl, n-propyl, isopropyl, t-butyl, n-butyl, sec-butyl, isobutyl, 1-pentyl, 2-pentyl, 3-pentyl, 3-methyl-2-butyl, isoamyl, and t-amyl. Illustrative hydroxy-substituted $C_2$-$C_6$ alkyl groups thus include, for example, 2-hydroxyethyl, 3-hydroxypropyl, 2,3-dihydroxypropyl, 2-hydroxy-2-methylethyl, 2-hydroxy-2,2,-dimethylethyl, 3-hydroxy-1-pentyl, glucosyl, trishydroxymethylmethyl, 2,2'-(bishydroxymethyl)ethyl and the like. In the above formula, when R represents a carbo-lower-alkoxy group, the lower alkoxy portion contains from 1–3 carbon atoms in conformity with the definition of lower alkyl above. Typical carbo-lower-alkoxy groups represented by R therefore include carbomethoxy, carboethoxy, carbo-n-propoxy and carbo-isopropoxy.

Compounds represented by the above formula are white, or yellowish white, crystalline solids melting, in general, above 100° C., and readily soluble in most polar organic solvents. They are prepared by reacting a 2,3-dioxopyrrolidine (II) with a thiosemicarbazide (III) in the presence of acid, according to the following reaction sequence:

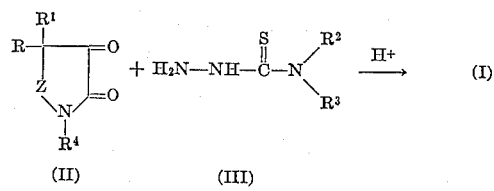

In the above formulas, R, $R^1$, $R^2$, $R^3$, $R^4$ and Z all have the same meaning as hereinabove.

The reaction conditions employed for carrying out the above reaction are those classically employed for the production of thiosemicarbazones from thiosemicarbazides and compounds having a carbonyl group.

During the course of the reaction between a 2,3-dioxopyrrolidine represented by Formula II above, when $R^1$ is hydrogen and R is a carbo-lower-alkoxy group, and a thiosemicarbazide represented by Formula III, a side reaction sometimes occurs, resulting in hydrolysis of the carbo-lower-alkoxy group to yield a carboxyl group which then spontaneously decarboxylates under the given reaction conditions. This hydrolysis is greatly favored when $R^2$ and $R^3$ are hydrogen, and is less favored when $R^2$ and $R^3$ are alkyl; in other words, it is more favored when thiosemicarbazide is used than when a dialkyl thiosemicarbazide is used.

Illustrative compounds produced by the above reaction include the following:

1-n-propyl-4-benzyl-2,3-dioxopyrrolidine-3-(4',4'-diethyl)thiosemicarbazone,
1-methyl-4-carboethoxy-2,3-dioxopyrrolidine-3-thiosemicarbazone,
1-isopropyl-4-(o-fluorobenzylidene)-2,3-dioxopyrrolidine-3-(4',4'-di-n-propyl)thiosemicarbazone,
1-ethyl-4-(p-nitrophenyl)-2,3,5-trioxopyrrolidine-3-(4'-methyl)thiosemicarbazone.

The compounds of this invention are useful as antiviral agents. They particularly manifest this activity against vaccinia virus and poliomyelitis type III virus.

This invention is further illustrated by reference to the following specific examples.

EXAMPLE I

*4-phenyl-2,3,5-trioxopyrrolidine-3-thiosemicarbazone*

Five grams of thiosemicarbazide hydrochloride were dissolved in 50 ml. of water. This solution was added to 100 ml. of an ethanol solution containing 9.4 g. of 4-phenyl-2,3,5-trioxopyrrolidine, maintained at refluxing temperature. After the addition had been completed, the reaction mixture was heated to reflux for another hour. The solvents were then removed by evaporation in vacuo, leaving as a residue, 4-phenyl-2,3,5-trioxopyrrolidine-3-thiosemicarbazone. Recrystallization of the residue from ethanol yielded purified 4-phenyl-2,3,5-trioxopyrrolidine - 3 - thiosemicarbazone melting at about 201° C.

Following the above procedure, 4-phenyl-2,3,5-trioxopyrrolidine was reacted with 4',4'-dimethylthiosemicarbazide hydrochloride to yield 4-phenyl-2,3,5-trioxopyrrolidine-3-(4',4'-dimethyl)thiosemicarbazone melting at about 182–183° C.

EXAMPLE II

*1-methyl-2,3-dioxopyrrolidine-3-thiosemicarbazone*

Twenty grams of 1-methyl-4-carboxyethoxy-2,3-dioxopyrrolidine and 10 g. of thiosemicarbazide were dissolved in 250 ml. of 50% aqueous ethanol containing 5 ml. of 12 N hydrochloric acid. The reaction mixture was heated to refluxing temperature for about three hours. 1-methyl-2,3-dioxopyrrolidine-3-thiosemicarbazone, formed in the above reaction, separated as a solid when the reaction mixture was cooled. The solid was separated and recrystallized from ethanol, yielding 1-methyl-2,3-dioxopyrrolidine-3-thiosemicarbazone melting at about 227° C. *Analysis.*—Calc.: C, 38.70; H, 5.42; N, 30.09. Found: C, 38.59; H, 5.50; N, 30.31.

During the above reaction, the carboethoxy group hydrolyzed to yield a carboxy group which then spontaneously decarboxylated to yield a pyrrolidine derivative lacking a substituent in the 4 position of the pyrrolidine ring.

1-ethyl-2,3-dioxopyrrolidine-3-thiosemicarbazone, melting at about 193–194° C., was prepared, utilizing the above procedure, from the corresponding 1-ethyl derivative, and 1-(trishydroxymethyl)methyl-2,3-dioxopyrrolidine-3-thiosemicarbazone from the corresponding 1-(trishydroxymethyl)methyl derivative.

EXAMPLE III

*1-ethyl-4-carboethoxy-2,3-dioxopyrrolidine-3-(4′,4′-dimethyl)thiosemicarbazone*

Following the procedure of Example II, 1-ethyl-4-carboethoxy-2,3-dioxopyrrolidine was reacted with 4′,4′-dimethylthiosemicarbazide in ethanolic hydrogen chloride to yield 1-ethyl-4-carboethoxy-2,3-dioxopyrrolidine-3-(4′,4′-dimethyl)thiosemicarbazide melting at about 155–156° C. *Analysis.*—Calc: C, 47.98; H, 6.71; N, 10.65; S, 10.67. Found: C, 48.14; H, 6.71; N, 10.79; S, 10.59.

During the above reaction, there was no hydrolysis of the carboethoxy group, and hence no decarboxylation occurring at the 4 position of the pyrrolidine ring, presumably because 4′,4′-dimethylthiosemicarbazide was used instead of thiosemicarbazide itself as in Example II.

EXAMPLE IV

*1-(2-hydroxyethyl)-2,3-dioxopyrrolidine-3-thiosemicarbazone*

One hundred twenty-four grams of 2-aminoethanol, 200 g. of ethyl acrylate and 100 ml. of ethanol were mixed. The temperature of the reaction rose to about 50° C. initially. After the reaction mixture had been allowed to stand over night, the solvents were removed in vacuo, leaving as a residue ethyl N-(2-hydroxyethyl)-β-aminopropionate. The crude reaction mixture was added to a solution of sodium ethoxide in anhydrous ethanol (prepared by adding 50 g. of sodium in small bits to the ethanol). Three hundred twenty grams of ethyl oxalate were next added. A solid began to precipitate immediately, and a second liter of anhydrous ethanol was added. The resulting mixture was stirred, while being heated at reflux temperature, for about two hours. The ethanol was removed by evaporation in vacuo. About 500 ml. of water were added to the resulting alkaline residue, which was then made acidic by the addition of dilute hydrochloric acid. While the resulting mixture was being cooled, a solid precipitated which was separated by filtration and dried. 1-(2-hydroxyethyl)-4-carboethoxy-2,3-dioxopyrrolidine thus obtained melted at about 145–146° C. after recrystallization from a mixture of benzene and hexane.

Following the procedure of Example II, 1-(2-hydroxyethyl)-4-carboethoxy-2,3-dioxopyrrolidine was reacted with thiosemicarbazide in ethanolic hydrogen chloride solution to yield the decarboethoxylated product, 1-(2-hydroxyethyl)-2,3-dioxopyrrolidine-3-thiosemicarbazone melting at about 215° C. *Analysis.*—Calc.: C, 38.87; H, 5.59; N, 25.91; S, 14.83. Found: C, 38.73; H, 5.83; N, 25.52; S, 14.69.

1-(2-hydroxyethyl)-4-carboethoxy-2,3-dioxopyrrolidine was also reacted with 4′,4′-dimethylthiosemicarbazide under the reaction conditions of Example II. As in the preparation of Example III, no hydrolysis of the carboethoxyl group took place during the reaction. Hence, the reaction product was 1-(2-hydroxyethyl)-4-carboethoxy-2,3-dioxopyrrolidine-3-(4′,4′-dimethyl)thiosemicarbazone melting at about 141–142° C. *Analysis.*—Calc: C, 45.55; H, 6.37; N, 17.71. Found: C, 45.75; H, 6.60; N, 17.92.

EXAMPLE V

*1-ethyl-4-benzylidene-2,3-dioxopyrrolidine-3-thiosemicarbazone*

Following the procedure of Example II, 1-ethyl-4-benzylidene-2,3-dioxopyrrolidine was reacted with thiosemicarbazide in ethanolic hydrogen chloride solution to yield 1-ethyl-4-benzylidene-2,3-dioxopyrrolidine-3-thiosemicarbazone melting at about 246° C. *Analysis.*—Calc: C, 58.31; H, 5.59; N, 19.43. Found: C, 57.87; H, 5.68; N, 19.19.

Other compounds prepared as above include:

1-ethyl-4-benzylidene-2,3-dioxopyrrolidine-3-(4′,4′-dimethyl)thiosemicarbazone; M.P.=214–215° C. *Analysis.*—Calc.: C, 60.73; H, 6.57; N, 17.70. Found: C, 60.77; H, 6.53: N, 17.47.

1-ethyl-4-(p-methoxy)benzylidene-2,3-dioxopyrrolidine-3-thiosemicarbazone; M.P.=260° C.

1-ethyl-4-(p-methoxy)benzylidene-2,3-dioxopyrrolidine-3-(4′,4′-dimethyl)thiosemicarbazone; M.P.=220° C.

1-ethyl-4-(p-chloro)benzylidene-2,3-dioxopyrrolidine-3-thiosemicarbazone; M.P.=271° C.

1-ethyl-4-(p-nitro)benzylidene-2,3-dioxopyrrolidine-3-thiosemicarbazone; M.P.=277° C.

1-ethyl-4-(p-nitro)benzylidene-2,3-dioxopyrrolidine-3-(4′,4′-dimethyl)thiosemicarbazone; M.P.=294° C.

1-ethyl-4-(4-phenyl)benzylidene-2,3-dioxopyrrolidine-3-thiosemicarbazone; M.P.=242–248° C.

The 2,3,5-trioxopyrrolidines which are employed as starting materials in preparing the 2,3,5-trioxopyrrolidine-3-thiosemicarbazones represented by Formula I above when Z is

are prepared by the method of Skinner and Miller, J. Am. Chem. Soc., 75, 977 (1953). According to this procedure, phenylacetonitrile or a substituted phenylacetonitrile is reacted with diethyl oxalate in the presence of sodium ethoxide or other base to yield an intermediate product which spontaneously ring closes, in the presence of acid, to yield a 4-phenyl-2,3,5-trioxopyrrolidine. Derivatives of a 2,3,5-trioxopyrrolidine in which the ring nitrogen is substituted are prepared by conventional procedures; for example, by preparing the potassium salt of the imide and reacting this salt with an alkyl halide.

The starting 2,3-dioxopyrrolidines useful in preparing the compounds of this invention are prepared according to the method of Southwick, J. Organic Chemistry, 21, 1087 (1956). This procedure involves the reaction of an ester of β-aminopropionic acid, which may contain substituents on the amino nitrogen, with diethyl oxalate in the presence of base, and has been illustrated with respect to the preparation of 1-(2-hydroxyethyl)-2,3-dioxopyrrolidine in Example IV, above. The benzylidene compounds which are employed as starting materials in Example V are also prepared by a procedure described by Southwick, this one being set forth in J. Organic Chemistry, 27, 981, (1962). According to this latter procedure, a 1-alkyl-4-carboethoxy-2,3-dioxopyrrolidine is caused to react with benzaldehyde, or a substituted benzaldehyde, to yield the corresponding 4-benzylidene derivative. The following are new 4-benzylidene-2,3-dioxopyrrolidenes prepared according to the above procedure:

1-(2-hydroxyethyl)-4-benzylidene - 2,3 - dioxopyrrolidine, M.P. 205° C. *Analysis.*—Calc.: C, 67.52; H, 5.67; N, 6.06. Found: C, 67.53; H, 5.89; N, 5.93.

1-ethyl-4-(p-methoxy)benzylidene-2,3 - dioxopyrrolidine, M.P. 182° C. *Analysis.*—Calc.: C, 68.55; H, 6.16. Found: C, 68.83; H, 6.46.

1-(2-hydroxyethyl)-4-(p-methoxy)benzylidene-2,3-dioxopyrrolidine, M.P. 254° C. *Analysis.*—Calc.: C, 64.36; H, 5.79; N, 5.36. Found: C, 64.41; H, 5.89; N, 5.27.

1-ethyl-4-(p-nitro)benzylidene-2,3-dioxopyrrolidine, M.P. 262° C. *Analysis.*—Calc.: C, 59.99; H, 4.65; N, 10.77. Found: C, 59.92; H, 4.67; N, 10.38.

1-ethyl-4 - (p-phenyl)benzylidene - 2,3 - dioxopyrrolidine, M.P. 192° C.

Starting materials (according to Formula II above) which contain a benzyl or substituted benzyl in the 4 position of the pyrrolidine ring are prepared by catalytically hydrogenating the corresponding benzylidene compounds. For example, low pressure hydrogenation of 1-ethyl-4-benzylidene-2,3-dioxopyrrolidine over a platinum catalyst yields 1-ethyl-4-benzyl-2,3-dioxopyrrolidine.

We claim:
1. A compound of the formula

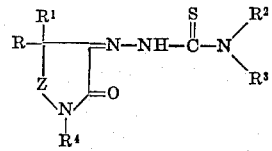

wherein R, when taken alone, is a member of the group consisting of hydrogen, phenyl, halophenyl, lower-alkoxyphenyl, phenylphenyl, nitrophenyl, benzyl, halobenzyl, lower-alkoxybenzyl, phenylbenzyl, nitrobenzyl, and carbolower-alkoxy; $R^1$, when taken alone, is hydrogen; R and $R^1$, when taken together, are members of the group consisting of benzylidene, halobenzylidene, lower alkoxybenzylidene, nitrobenzylidene, and phenylbenzylidene; $R^2$ and $R^3$ are members of the group consisting of hydrogen and lower alkyl; $R^4$ is a member of the group consisting of lower alkyl and hydroxy-substituted $C_2$–$C_6$ alkyl; and Z is a member of the group consisting of —$CH_2$— and

2. 1 - ethyl - 4 - carboethoxy - 2,3 - dioxopyrrolidine-3-(4',4'-dimethylthiosemicarbazone).

3. 1 - (2 - hydroxyethyl) - 2,3 - dioxopyrrolidine - 3-thiosemicarbazone.

4. 4 - phenyl - 2,3,5 - trioxopyrrolidine - 3 - (4',4'-dimethylthiosemicarbazone).

5. 1 - (trishydroxymethyl)methyl - 2,3 - dioxopyrrolidine-3-thiosemicarbazone.

No reference cited.

ALEX MAZEL, *Primary Examiner.*

HENRY R. JILES, *Examiner.*

JOSEPH A. NARCAVAGE, *Assistant Examiner.*